2,954,350

NITROPARAFFIN GELS

Robert F. Purcell, Terre Haute, Ind., assignor to Commercial Solvents Corporation, Terre Haute, Ind., a corporation of Maryland No Drawing. Filed July 1, 1957, Ser. No. 668,913

4 Claims. (Cl. 252—316)

My invention relates to the reaction product of 2-amino-2-methylpropanol and a secondary nitroparaffin, and more particularly to the highly absorbent gel-like crystalline solid formed by the reaction of secondary nitroparaffins with 2-amino-2-methylpropanol.

I have discovered that secondary nitroparaffins and 2-amino-2-methylpropanol form crystalline reaction products that have great absorbent powers for excess nitroparaffins or inert solvents contained in the reaction mixture.

I prefer to use pure 2-amino-2-methylpropanol in preparing the reaction products of my invention; however, it need not be pure so long as impurities contained in the 2-amino-2-methylpropanol are unreactive toward the components of the reaction mixture. Where pure 2-amino-2-methylpropanol and secondary nitroparaffins are utilized to form the reaction products of my invention, as little as 3% by volume 2-amino-2-methylpropanol is needed to form the reaction products of my invention. However, I prefer to use 2-amino-2-methylpropanol in excess of 5% in 2-amino-2-methylpropanol-secondary nitroparaffin mixtures containing no inert diluents. I have found that it is necessary to include about 10% 2-amino-2-methylpropanol in reaction mixtures where inert diluents are included in the reaction mixture. Diluents which may be added to the reaction mixture are those diluents which do not react with either the 2-amino-2-methylpropanol, the secondary nitroparaffins, or the reaction product in such a manner as to prevent the formation of a gel. Diluents which I have found to be inert in the reaction mixture are such materials as primary and tertiary nitroparaffins, ketones, alcohols, ethers, chlorine-substituted hydrocarbons, etc. I have found that a few inert diluents, such as alcohols, reduce the temperature at which the gel forms to a considerable extent. Thus, while 2-amino-2-methylpropanol-2-nitropropane gels generally form at 70° F., a 2-amino-2-methylpropanol-2-nitropropane-ethyl alcohol mixture will form a gel at a temperature of about 20° F. Where a higher molecular weight secondary nitroparaffin or a liquid amine is added to a 2-amino-2-methylpropanol-2-nitropropane mixture, the gelation temperature is generally reduced. In some instances, these diluents may be incorporated into a partially gelled mixture of 2-amino-2-methylpropanol and 2-nitropropane with good results. Using this procedure, a gelled explosive was prepared by adding fifty parts by weight of a 20:80 ethylene diamine-nitromethane mixture to 50 parts of a partially gelled reaction product of 2-amino-2-methylpropanol and 2-nitropropane. Gels of this type are usually relatively unstable and break down within a week or two.

The nitroparaffins which are operative in forming the reaction products of my invention are the aliphatic secondary nitroparaffins. Among the secondary nitroparaffins which I have found to be useful in preparing the gels of my invention are 2-nitropropane and 2-nitrobutane. 2-Amino-2-methylpropanol-2-nitropropane gels form easily at room temperatures; however, as the molecular weight of the secondary nitroparaffin increases, the gelation temperature decreases. Thus, temperatures of about 20° F. are necessary to form the gel-like product of 2-amino-2-methylpropanol-2-nitrobutane.

The gelled product formed from 2-nitropropane and 2-amino-2-methylpropanol breaks down at the refluxing temperature of the reaction product, about 120° F. The reaction product of 2-amino-2-methylpropanol-2-nitrobutane breaks down at temperatures of about 70° F., and it can be seen that, as the gel formation temperature decreases, the temperatures at which the gel-like products remained stable also decreases.

The reaction products of my invention are white gel-like materials ranging from soft, wet, gels to dry, wax-like products. The hardness and the dryness of the reaction products are determined by the amount of 2-amino-2-methylpropanol in the reaction mixture. Thus, soft wet gels form from reaction mixtures containing about 3% by volume 2-amino-2-methylpropanol while hard, wax-like products are formed when as much as about 10% 2-amino-2-methylpropanol is present in a solution of 2-nitropropane.

The amount of 2-amino-2-methylpropanol in the reaction mixture also determines the stability of the product. A gel containing about 3% 2-amino-2-methylpropanol breaks down in less than 10 days while a mixture containing 15% 2-amino-2-methylpropanol is found to be completely dry at the end of three months.

I have found that the gel-like products of my invention can be utilized as paint removers, lubricants, explosives, propellants, insecticides, fumigants, etc.

The following example is offered to illustrate my invention and it is not intended that my invention be limited to the specific amounts and proportions set forth herein.

EXAMPLE I

The following table lists some of the components from which I have formulated my gel-like reaction products. It also indicates the temperatures necessary for gel formation in each instance.

*Reaction products formed under the following conditions*

| Nitroparaffin | Percent | Diluent | Percent | Percent 2-Amino-2-Methyl-propanol | Crystal Formation Temperature, ° F. |
|---|---|---|---|---|---|
| 2-Nitrobutane | 95 | | | 5 | 20 |
| 2-Nitropropane | 95 | | | 3 | 70 |
| Do | 45 | Toluene | 45 | 10 | 70 |
| Do | 45 | Nitromethane | 45 | 10 | 70 |
| Do | 37.5 | Methyl Ethyl Ketone | 37.5 | 15 | 70 |
| Do | 37.5 | Methylene Chloride | 37.5 | 15 | 70 |
| Do | 37.5 | Ethyl Ether | 37.5 | 15 | 70 |
| Do | 37.5 | Ethyl Alcohol | 37.5 | 15 | 20 |
| Do | 37.5 | Butyl Alcohol | 37.5 | 15 | 20 |
| Do | 37.5 | 2-Nitrobutane | 37.5 | 15 | 20 |
| Do | 89+ | Water | | 10 | 70 |

Now having described my invention, what I claim is:

1. In a process for the production of gel-like compositions from 2-nitroalkanes selected from the group consisting of 2-nitropropane and 2-nitrobutane, the step which comprises adding from about 3% to about 15% by weight of 2-amino-2-methylpropanol to the 2-nitroalkane, the temperature of the 2-nitroalkane at the time of said addition being maintained at about 70° F. and below, with 2-nitropropane and at about 20° F. and below with 2-nitrobutane.

2. In a process for the production of gel-like compositions from 2-nitroalkanes selected from the group consisting of 2-nitropropane and 2-nitrobutane, the step which comprises adding from about 10% to about 15% by weight of 2-amino-2-methylpropanol to a 2-nitroalkane selected from the group consisting of 2-nitropropane and 2-nitrobutane and a liquid diluent for said 2-nitroalkane which is inert under the conditions of said addition to said 2-nitroalkane and said 2-amino-2-methylpropanol, the temperature of said 2-nitroalkane-inert diluent mixture at the time of said addition being maintained at about 70° F. and below when the 2-nitroalkane is 2-nitropropane, and at 20° F. and below when the 2-nitroalkane is 2-nitrobutane.

3. As a new composition of matter, the gel-like composition obtained by adding from about 3% to about 15% by weight of 2-amino-2-methylpropanol to a 2-nitroalkane selected from the group consisting of 2-nitropropane and 2-nitroalkane, the temperature of the 2-nitropropane at the time of said addition being maintained at about 70° F. and below, and the temperature of the 2-nitrobutane at the time of addition being maintained at 20° F. and below.

4. As a new composition of matter, the gel-like composition obtained by adding about 10% to about 15% by weight of 2-amino-2-methylpropanol to a mixture of 2-nitroalkane selected from the group consisting of 2-nitropropane and 2-nitrobutane and a liquid diluent inert to said 2-nitroalkane and said 2-amino-2-methylpropanol under the conditions of said addition, the temperature of said 2-nitroalkane-inert diluent mixture at the time of said addition being maintained at about 70° F. and below when the 2-nitroalkane is 2-nitropropane and at 20° F. and below when the 2-nitroalkane is 2-nitrobutane.

References Cited in the file of this patent
UNITED STATES PATENTS
2,712,989     Maisner _____ July 12, 1955